2 Sheets—Sheet 1.

H. B. STEVENS.
Coffee-Separators.

No. 210,817. Patented Dec. 10, 1878.

Witnesses:
Chas. J. Buchheit
Edward J. Brady

H. B. Stevens Inventor
By Wilhelm & Bonner
Attorneys

H. B. STEVENS.
Coffee-Separators.
No. 210,817.        Patented Dec. 10, 1878.
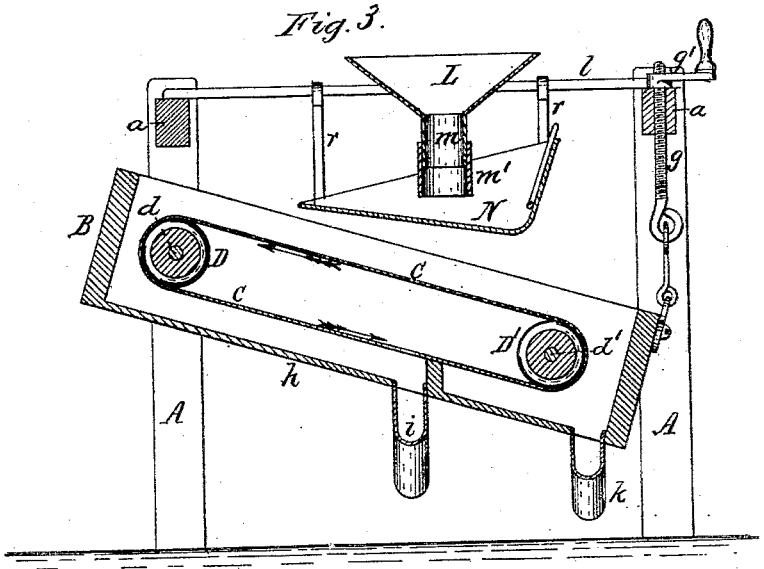
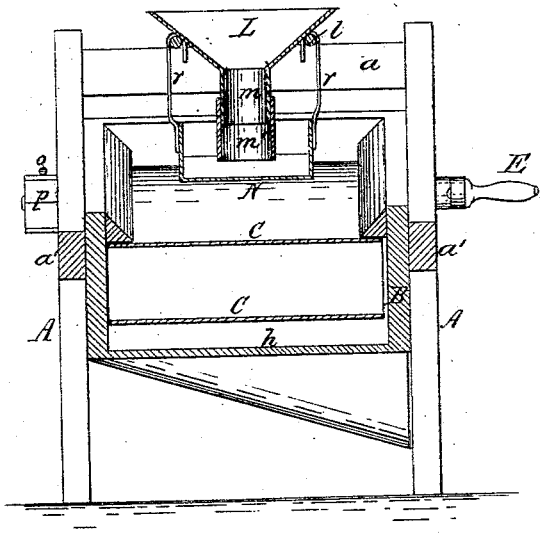
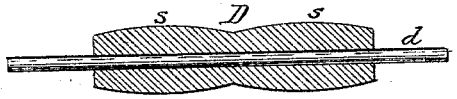
Witnesses:
Chas. J. Buchheit
Edward J. Brady
H. B. Stevens Inventor.
By Wilhelm & Bonner
Attorneys

UNITED STATES PATENT OFFICE.

HENRY B. STEVENS, OF BUFFALO, NEW YORK, ASSIGNOR TO GEORGE L. SQUIER, OF SAME PLACE.

IMPROVEMENT IN COFFEE-SEPARATORS.

Specification forming part of Letters Patent No. 210,817, dated December 10, 1878; application filed September 26, 1878.

*To all whom it may concern:*

Be it known that I, HENRY B. STEVENS, of the city of Buffalo, in the county of Erie and State of New York, have invented new and useful Improvements in Machines for Separating Coffee and other Grains and Seeds, of which the following is a specification, reference being had to the accompanying drawings.

My invention relates to a machine for separating coffee and other grains and seeds in which flat and round kernels or berries are mixed together. Nearly all coffee, as it comes from the producer, contains a quantity of round grains, called "pea grains" or "mocha," which command a higher price in the market than the flat grains of the same lot of coffee, and it is therefore important to separate these round grains from the rest. Previous to my invention this separation had been effected, with partial success, either by hand or by machines containing sieves or riddles. This latter method is defective, for the reason that the screens or riddles will take out only round kernels of a size corresponding with the size of their mesh, while the flat grains of the same size will also pass through the openings of the riddles with the round grains. As the round grains vary in size as much as the flat grains, it becomes necessary to employ a large number of riddles, of different mesh, and to manipulate the coffee repeatedly, in order to separate the bulk of the round grains from the flat grains.

The object of my invention is to separate all of the round grains from the flat grains at one operation.

My invention consists, principally, of a separating-machine provided with an endless separating apron or carrier, arranged at such an inclination that the round grains will roll down over the inclined apron and be discharged at the foot thereof, while the flat grains will be carried up by the inclined apron and be discharged at the head thereof; also, of several details of construction and particular arrangements of the various parts constituting my improved separating-machine, whereby it is enabled to attain the desired object in a very complete and satisfactory manner, as will be hereinafter fully set forth.

Figure 1:
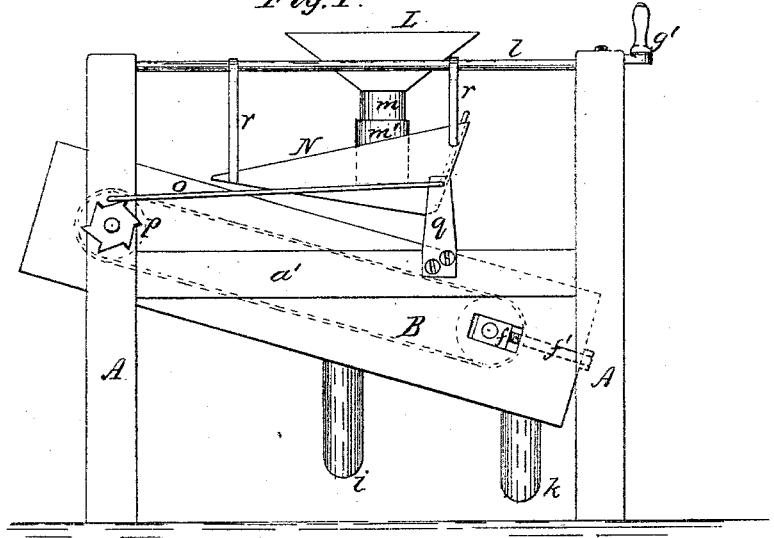
Figure 2:
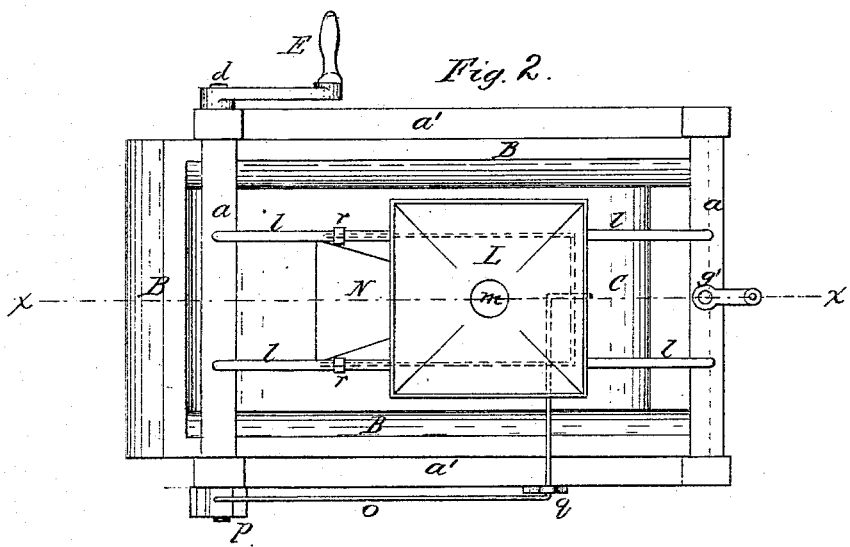

In the accompanying drawings, Figure 1 is a side elevation of my improved machine. Fig. 2 is a top-plan view thereof. Fig. 3 is a longitudinal section thereof on line $x\ x$ of Fig. 2. Fig. 4 is a cross-section. Fig. 5 is a detached view of one of the rollers over which the endless apron passes.

Like letters of reference refer to like parts in each of the figures.

A represents the posts of the stationary frame of the machine, connected at the top by cross-pieces $a\ a$, and at the sides by longitudinal pieces $a'\ a'$. B represents the apron-frame, arranged between the posts A A, and C the endless apron, running over rollers D D', having their shafts $d\ d'$ supported in the frame B. The shaft $d$ of the upper roller, D, extends through the sides of the frame B and the posts A and forms pivots for the frame B, on which it can be swung in raising and lowering the opposite end of the frame for adjusting the inclination of the apron C. E is a hand-crank, secured to the shaft $d$, for actuating the apron C. The shaft $d'$ of the lower roller, D', is supported in boxes $f$, made adjustable in the frame B by set-screws $f'$, or other suitable devices, to maintain the proper tension of the apron. The lower end of the frame B is supported by a screw, $g$, passing through one of the cross-pieces $a$, and provided above the same with a hand-nut, $g'$, in such manner that the screw $g$ and the end of the frame B connected therewith can be readily raised and lowered. The frame B is provided with a bottom-board, $h$, having a discharge-opening, $i$, at a short distance below the head of the apron, and another discharge-opening, $k$, below the foot of the apron. Both openings may be provided with suitable spouts.

L is the feed-hopper, arranged above the apron C, near the middle thereof, and supported upon longitudinal bars $l$, resting on the cross-pieces $a$. The discharge-spout $m$ of the hopper L is provided with an adjustable sleeve, $m'$, which can be raised and lowered to regulate the feed. N is a shaking-shoe, arranged underneath the hopper L, for delivering the material discharged from the hopper in a thin sheet upon the apron C, near its head. The shoe N is jarred or shaken by means of an elastic arm, o, bearing with its free end upon a cam or ratchet wheel, p, secured to the shaft d. The arm o is bent, and supported near its bent end in a bearing or standard, q, and connected at its opposite end with the shoe N, so as to oscillate the same. The shoe is supported by elastic hangers r, attached to the bars l.

The rollers or pulleys D D', over which the endless apron passes, are constructed with a convex portion, s, near each end, as clearly represented in Fig. 5, whereby the apron is kept taut transversely, or prevented from becoming wrinkled.

The grain being put into the hopper, and motion being imparted to the apron, the shaking of the shoe slowly feeds the grain onto the apron in a wide thin stream, the mouth of the shoe being nearly as wide as the apron. The apron carries by its upward motion all the flat grains which lodge on it upward and over the head of the apron, where they escape through the discharge-opening i, while the round grains do not lodge, but roll down by the force of gravity, and escape at the foot of the apron through the discharge-opening k. The apron should be adjusted to such an inclination as to permit all of the round grains to roll down without causing the flat grains to roll, and the feed should be so regulated that the flat grains do not accumulate on the apron and obstruct the passage of the round grains, while the apron should not travel so fast as not to give the round grains time to roll down.

It is obvious that the apron C may be inclined transversely instead of longitudinally, so that the round grains will roll down and be discharged along the lower edge of the apron, and the flat grains be carried to one end; but this is not as preferable as the arrangement shown.

When the apparatus is properly adjusted and speeded, all the round grains, of whatever size, will be separated from the flat grains at one operation.

My improved separator is very simple and durable, and constructed at comparatively small expense.

It is evident that my improved machine can be employed for separating any kind of round grains from flat or irregular grains or seeds.

I claim as my invention—

1. In a machine for separating round from flat or irregular grains or seeds, the combination, with an inclined endless belt or apron, C, of the rollers D D', constructed with a convex portion, s, near each end, for stretching the endless apron transversely, substantially as set forth.

2. The combination, with the stationary main frame A, of the inclined apron C, arranged in the movable frame B, pivoted at its upper end to the stationary main frame, and made vertically adjustable at its lower end for regulating the inclination of the apron, substantially as set forth.

3. The combination, with the stationary frame, of the inclined apron C and frame B, provided with bottom h, having discharge-openings i k, substantially as and for the purpose set forth.

4. The combination, with the inclined apron C, of the feed-hopper L, provided with adjustable sleeve m', and shaking shoe N, substantially as and for the purpose set forth.

H. B. STEVENS.

Witnesses:
JNO. J. BONNER,
CHAS. J. BUCHHEIT.